(12) United States Patent
Heinrich et al.

(10) Patent No.: US 9,644,539 B2
(45) Date of Patent: May 9, 2017

(54) COOLING AIR TEMPERATURE REDUCTION USING NOZZLES

(71) Applicants: Chad W Heinrich, Oviedo, FL (US); Stephen Erick Holland, Oviedo, FL (US)

(72) Inventors: Chad W Heinrich, Oviedo, FL (US); Stephen Erick Holland, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 777 days.

(21) Appl. No.: 14/077,475

(22) Filed: Nov. 12, 2013

(65) Prior Publication Data

US 2015/0128598 A1    May 14, 2015

(51) Int. Cl.
*F02C 7/18*    (2006.01)
(52) U.S. Cl.
CPC ............ *F02C 7/18* (2013.01); *F05D 2240/12* (2013.01); *Y02T 50/675* (2013.01)
(58) Field of Classification Search
CPC .......... F01D 5/081; F01D 5/085; F01D 5/187; F01D 9/065; F01D 25/12; F01D 25/24; F02C 7/18; F05D 2240/12
See application file for complete search history.

(56) References Cited

U.S. PATENT DOCUMENTS

| | | | | |
|---|---|---|---|---|
| 3,816,022 A * | 6/1974 | Day | ........................ | F01D 5/185 416/191 |
| 4,177,011 A * | 12/1979 | Eskesen | .................. | F01D 5/225 416/191 |
| 4,565,490 A * | 1/1986 | Rice | ........................ | F01K 23/10 415/114 |
| 5,096,379 A * | 3/1992 | Stroud | ................. | B23K 26/388 29/889.721 |
| 5,993,150 A * | 11/1999 | Liotta | ..................... | F01D 11/10 415/115 |
| 6,644,012 B2 * | 11/2003 | Hoffmann | ............... | F01K 23/10 415/115 |
| 8,511,990 B2 * | 8/2013 | Giri | ........................ | F01D 5/187 416/92 |
| 2004/0115053 A1* | 6/2004 | Shi | ......................... | F01D 5/187 416/97 R |
| 2009/0317258 A1* | 12/2009 | Tibbott | ................... | F01D 5/187 416/97 R |

* cited by examiner

*Primary Examiner* — Igor Kershteyn

(57) ABSTRACT

A converging-diverging nozzle that has particular application for providing a cooling air flow to ring segments in a gas turbine engine. The engine includes a turbine section that receives a hot working gas. The turbine section includes at least one row of vanes, at least one row of blades and a plurality of ring segments forming at least one ring. The ring segments and the vanes are mounted to a vane carrier, where the vane carrier includes a cooling flow channel for each of the ring segments that receives an air flow to cool the ring segments. A plug is provided in each channel and has an internal bore shaped to define the converging-diverging nozzle through which the air flows so as to create a supersonic flow that reduces the temperature of the air and thus provides more cooling for the same amount of air flow.

17 Claims, 4 Drawing Sheets

COOLING AIR TEMPERATURE REDUCTION USING NOZZLES

BACKGROUND OF THE INVENTION

Field of the Invention

This invention relates generally to a converging-diverging nozzle for providing reduced temperature cooling air and, more particularly, to a converging-diverging nozzle positioned within a cooling fluid flow path in a turbine section of a gas turbine engine for providing reduced temperature cooling air for cooling ring segments.

Discussion of the Related Art

The worlds energy needs continue to rise which provides a demand for reliable, affordable, efficient and environmentally-compatible power generation. Gas turbine engines are one known machine that provide efficient power, and often have application for electric generators in a power plant, or engines in an aircraft or a ship. A typically gas turbine engine includes a compressor section, a combustion section and a turbine section. The compressor section provides a compressed air flow to the combustion section where the air is mixed with a fuel and ignited to generate a working gas typically having a temperature above 1300° C. The working gas expands through the turbine section and is guided across blades by associated vanes. As the working gas passes through the turbine section, it causes the blades to rotate, which in turn causes a shaft to rotate, thereby providing mechanical work.

The temperature of the working gas is tightly controlled so that it does not exceed some predetermined temperature for a particular turbine engine design because to high of a temperature can damage various parts and components in the turbine section of the engine. However, it is desirable to allow the temperature of the working gas to be as high as possible because the higher the temperature of the working gas, the faster the flow of the gas, which results in a more efficient operation of the engine.

In certain gas engine turbine designs, a portion of the compressed air flow is also used to provide cooling for certain components in the turbine section, typically the vanes, blades and ring segments. Thus, the more cooling and/or the more efficient cooling that can be provided to these components allows the components to be maintained at a lower temperature, and thus the higher the temperature of the working gas can be. In other words, by reducing the temperature of the compressed gas, less compressed gas is required to maintain the part at the desired temperature, resulting in a higher working gas temperature and a greater power and efficiency from the engine. Further, by using less cooling air at one location in the turbine section, more cooling air can be used at another location in the turbine section. For example, in one known turbine engine design, 80% of the compressed air flow is mixed with the fuel to provide the working gas and 20% of the compressed air flow is used to cool the turbine section parts. If less of that cooling air is used at one particular location as a result of the cooling air being lower in temperature, then more cooling air can be used at other areas in the turbine section for increased cooling.

SUMMARY OF THE INVENTION

In accordance with the teachings of the present invention, a converging-diverging nozzle is disclosed that has particular application for providing a cooling air flow to ring segments in a gas turbine engine. The gas turbine engine includes a compressor section that produces compressed air and a combustion section in fluid communication with the compressor section that receives the compressed air and mixes it with a fuel to generate a hot working gas. The gas turbine engine also includes a turbine section in fluid communication with the combustion section that receives the hot working gas. The turbine section includes at least one row of vanes, at least one row of blades and a plurality of ring segments forming at least one ring. The ring segments and the at least one row of vanes are mounted to a vane carrier, where the vane carrier includes a cooling flow channel for each of the ring segments that receives a portion of the compressed air to cool the ring segments. A plug is provided in each channel and has an internal bore shaped to define the converging-diverging nozzle through which the compressed air flows so as to create a supersonic flow that reduces the temperature of the compressed gas and thus provides more cooling for the same amount of air flow.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a converging-diverging nozzle for providing a reduced temperature cooling gas flow is merely exemplary in nature and is in no way intended to limit the invention or its applications or uses. For example, the discussion below states that the converging-diverging nozzle has particular application for providing a cooling gas flow to ring segments in the turbine section of a gas turbine engine. However, as will be appreciated by those skilled in the art, the converging-diverging nozzle of the invention may have application for providing a cooling gas flow to other components in a gas turbine engine, and other cooling gas flow applications other than for gas turbine engines.

Figure 1:
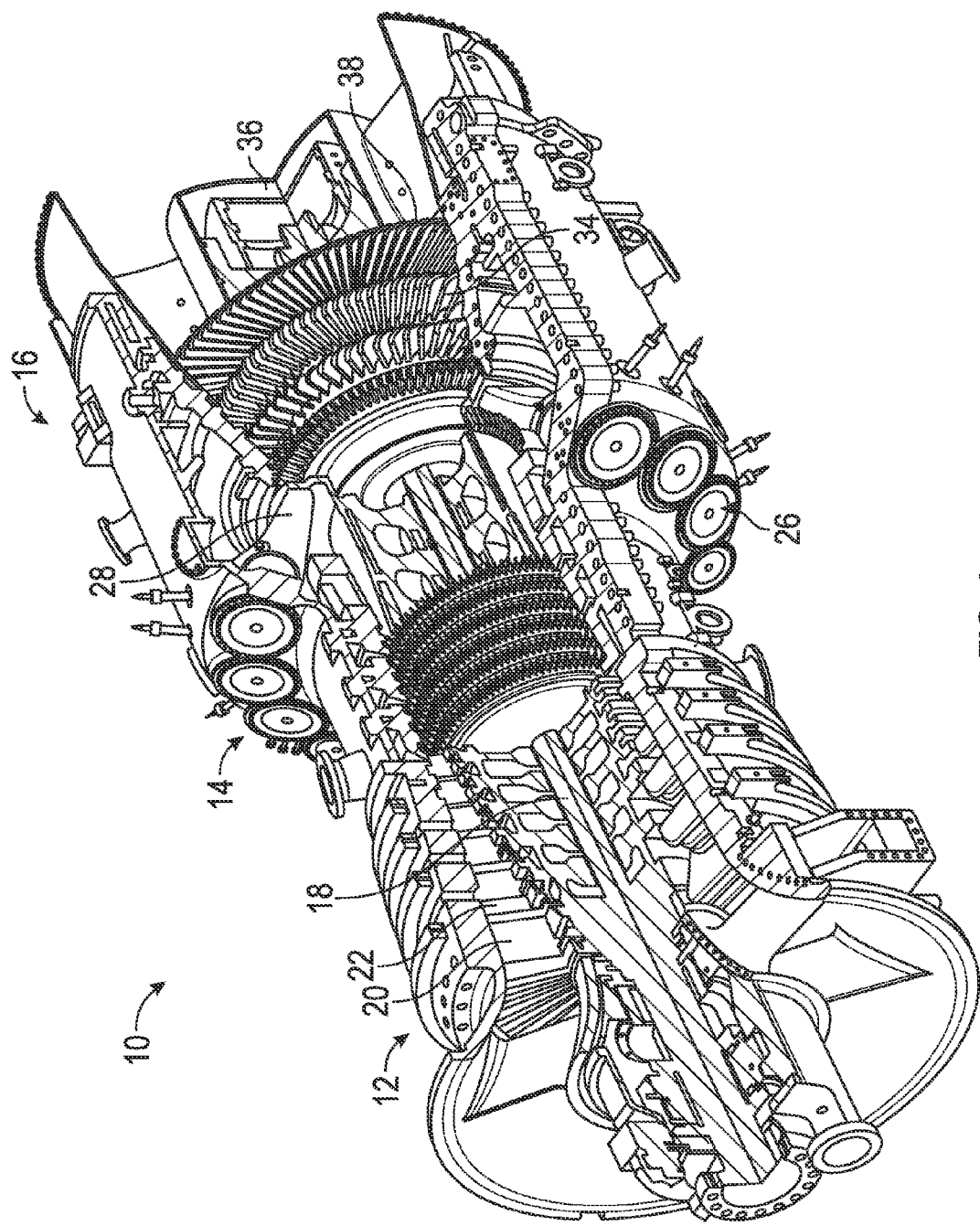
FIG. 1 is a cut-away, isometric view of a gas turbine engine.

FIG. 1 is a cut-away isometric view of a gas turbine engine 10 including a compressor section 12, a combustion section 14 and a turbine section 16, where operation of the engine 10 causes a central shaft 18 or rotor to rotate, thus creating mechanical power. Rotation of the shaft 18 draws air into the compressor section 12 where it is directed by vanes 22 and compressed by rotating blades 20 to be delivered to the combustion section 14 where the compressed air is mixed with ignition fuel, such as propane, and where the fuel/air mixture is ignited to create a hot working gas. More specifically, the combustion section 14 includes a number of circumferentially disposed combustion chambers 26 each receiving the ignition fuel that is sprayed into the chamber 26 by an injector (not shown) and mixed with the compressed air to be combusted to create the working gas, which is directed by a nozzle 28 into the turbine section 16. The working gas is directed by circumferentially disposed stationary vanes 32 (see FIG. 2) in the turbine section 16 to flow across circumferentially disposed rotatable turbine blades 34, which causes the turbine blades 34 to rotate, thus rotating the shaft 18. Each group of the circumferentially disposed stationary vanes 32 defines a row of the vanes 32 and each group of the circumferentially disposed blades 34 defines a row of the blades 34. Once the working gas passes through the turbine section 16 it is output from the engine 10 as an exhaust gas through output nozzle 36.

In this non-limiting embodiment, the turbine section 16 includes four rows 38 of the rotating blades 34 and four rows of the stationary vanes 32 in an alternating sequence. In other gas turbine engine designs, the turbine section 16 may include more or less rows of the turbine blades 34. It is noted that the most forward row of the turbine blades 34 and the vanes 32 receive the highest temperature of the working gas, where the temperature of the working gas decreases as it flows through the turbine section 16.

Figure 2:
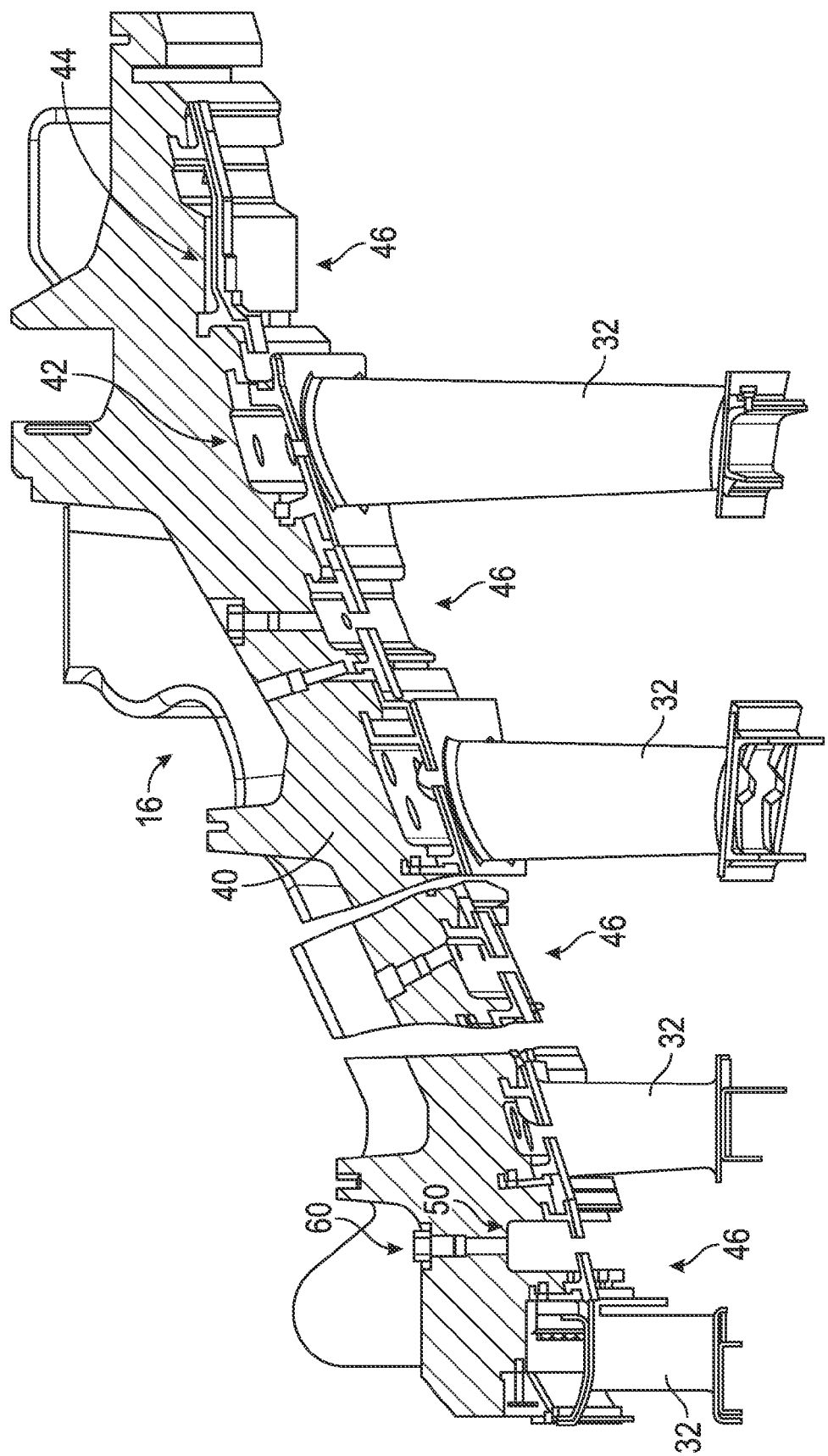
FIG. 2 is a cross-sectional, broken-away view of a portion of the turbine section of the gas turbine engine shown in FIG. 1.

FIG. 2 is a cross-sectional type view of a portion of the turbine section 16 and specifically a turbine vane carrier 40. The vane carrier 40 includes a number of mounting structures 42 for securing each of the plurality of vanes 32 for each of the four rows of the vanes 32 to the vane carrier 40. A plurality of circumferentially disposed ring segments 46 are mounted to the vane carrier 40 by a separate mounting structure 44 and define a ring where the ring segments 46 for a particular ring are positioned adjacent to each other to form the ring, and where a separate ring is provided for each row of the blades 34. As is well understood by those skilled in the art, the ring segments 46 provide a sealing structure that allows the blades 34 (not shown in FIG. 2) to rotate in close proximity to the ring segments 46 to limit the amount of the working gas that can flow past the blades 34 without causing the blades 34 to rotate. The number and size of the ring segments 46 will be different for each blade row or stage, and would be different from turbine design to turbine design.

Figure 3:
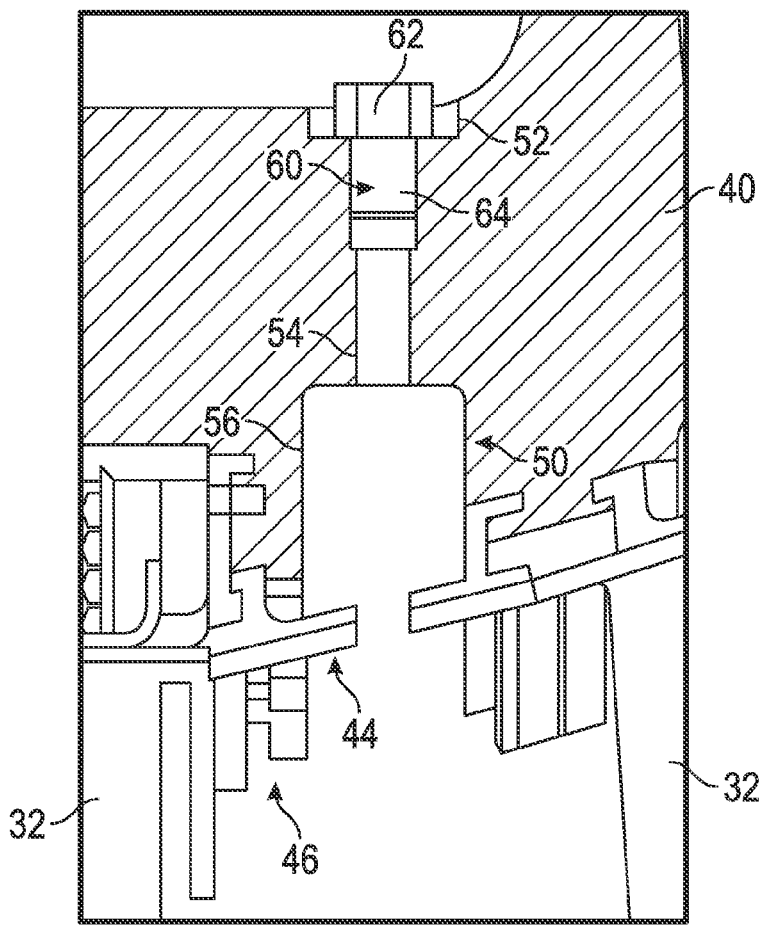
FIG. 3 is an enlarged view of a portion of the turbine section shown in FIG. 2 specifically showing a ring segment.

FIG. 3 is a blown-up view of one of the ring segments 46 provided between the first and second rows of the vanes 32 to illustrate how the ring segments 46 are cooled using the compressed air from the compression section 12 during operation of the engine 10. Particularly, a cylindrical channel 50 is formed through the vane carrier 40 for each ring segment 46 in each ring from an outside surface of the vane carrier 40 to the location where the ring segment 46 is mounted to the vane carrier 40. In this particular non-limiting design, the channel 50 includes a wide top portion 52, a narrow middle portion 54 and a wide bottom portion 56. A plug 60 is mounted within the channel 50 so that a head 62 of the plug 60 sits in the top portion 52 and a body 64 of the plug 60 extends into the narrow portion 54. In this particular design, only the ring segments 46 in the first three rows of the rings receive the cooling air as it is not necessary to cool the last row of the ring segments 46 because the temperature of the working gas is reduced to a low enough temperature by that location in the turbine section 16.

Figure 4:
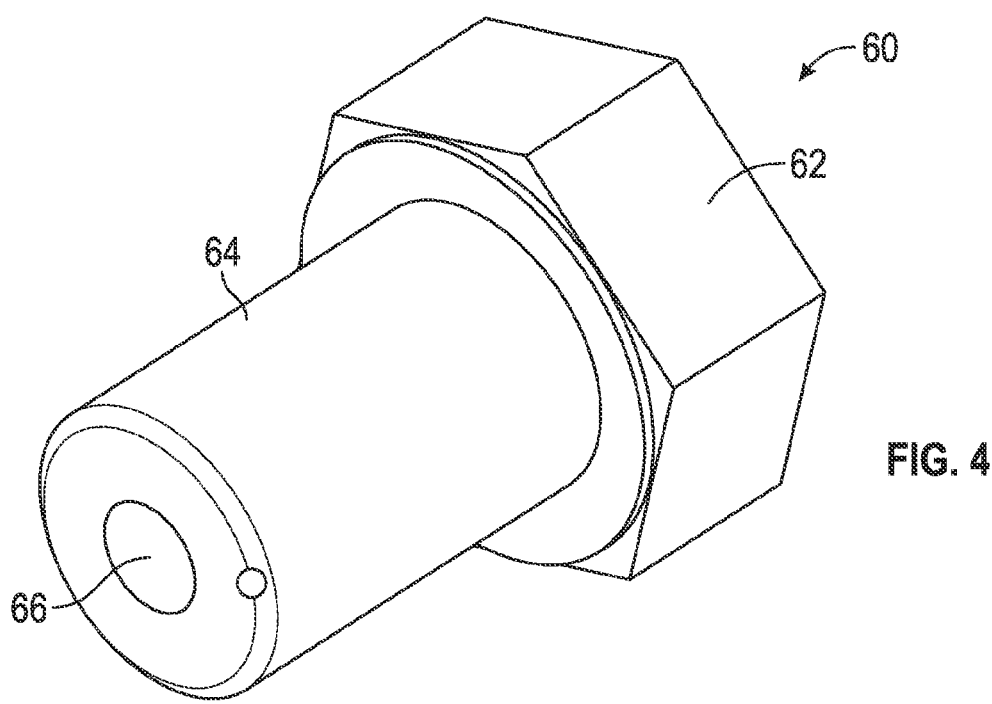
FIG. 4 is an isometric view of a cooling channel plug including a cooling gas flow channel therein.

FIG. 4 is an isometric view of the plug 60 separated from the vane carrier 40. A cylindrical metering channel 66 is formed axially through the plug 60 so that a controlled amount of the cooling air can flow through the plug 60 and into the lower portion of the channel 50. Suitable plumbing (not shown) is provided, such as appropriately formed channels in the vane carrier 40 and other structural elements of the turbine section 16, to allow the compressed cooling air flow from the compressor section 12 to be directed through the plug 60 and into the channel 50 to cool the ring segment 64. The size of the channel 50 in the vane carrier 40 and the size of the channel 66 in the plug 60 are carefully engineered so that the desired amount of mass air flow is provided to all of the ring segments 46 in all of the rings, and be able to provide a cooling air flow to the other parts in the turbine section 16 without compromising turbine engine efficiency.

Figure 5:
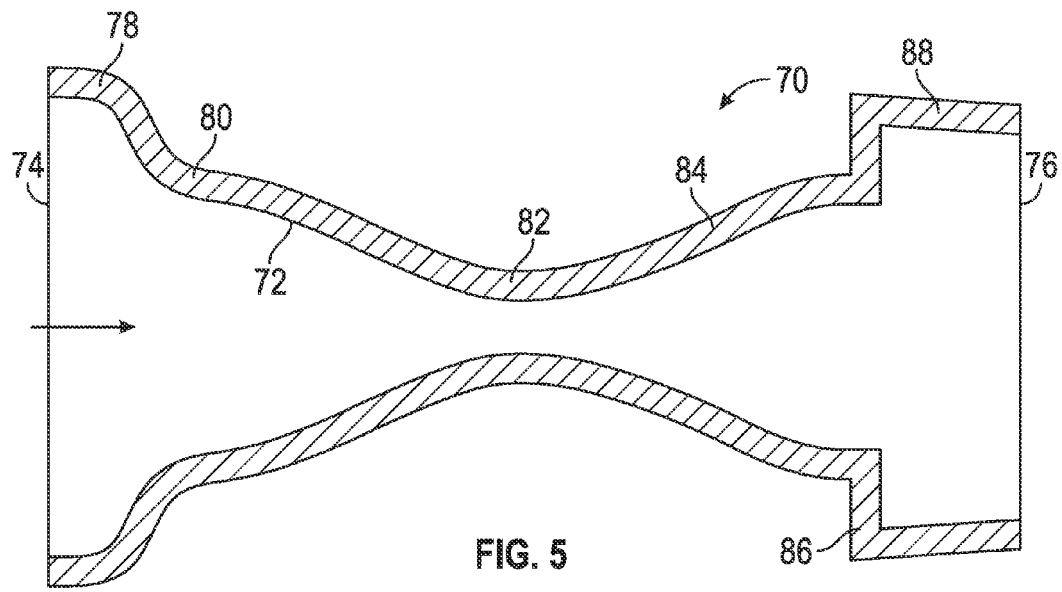
FIG. 5 is a cross-sectional view of a converging-diverging nozzle.

The present invention proposes replacing the plug 60 with a similarly configured plug of the same size that would fit in the existing cooling channel 50 for the ring segment 46 for a particular turbine engine and which includes an internal flow channel configured as a converging-diverging nozzle. FIG. 5 is a cross-sectional view of a converging-diverging nozzle 70 having a flow channel 72 suitable for this purpose. Particularly, the nozzle 70 would replace the cylindrical channel 66 in the plug 60 through which the compressed air flows. As will be discussed in more detail below, the channel 72 has a particular hour-glass shape that provides subsonic-sonic-supersonic flow that causes a decrease in temperature of the air as it flows through the channel 72. The physics that causes changes in temperature and pressure of gas flowing through a converging-diverging nozzle is well understood by those skilled in the art.

The flow channel 72 of the nozzle 70 has the shape shown in FIG. 5, where the gas flows through the channel 72 from an input end 74 to an output end 76. The channel 72 includes a wide input section 78 that is coupled to a converging section 80 which in turn is coupled to a narrow throat section 82 representing the narrowest part of the channel 72. The throat section 82 is coupled to a diverging section 84 that is coupled to an annular shoulder 86 that defines a wide end section 88 at the output end 76 of the nozzle 70 having the same diameter as the wide end section 88.

Figure 6:
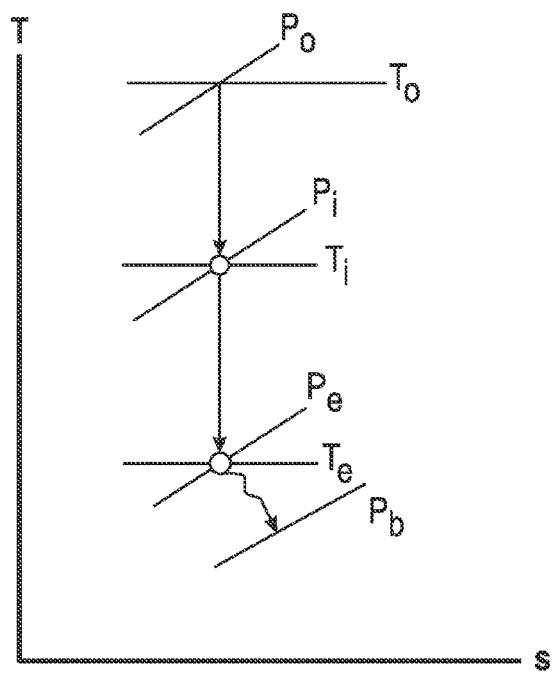
FIG. 6 is a graph with entropy on the horizontal axis and temperature on the vertical axis showing a temperature and pressure relationship of a gas flowing through the converging-diverging nozzle.

The mass flow rate of the compressed air provided to the plug 60 is such that sufficient cooling is provided during operation of the engine 10. Further, as the air flows through the channel 72 the entropy s of the air also is maintained relatively constant as the pressure and temperature of the air flow changes. The velocity of the air flow increases as it flows through the converging flow channel 72 and correspondingly, the pressure of the air flow and temperature of the air flow decreases. This relationship between pressure and temperature of the air flow through the channel 72 is illustrated in the graph of FIG. 6 with entropy s on the horizontal axis and temperature T on the vertical axis. At the input end 74 of the nozzle 70, the pressure of the gas is represented by $P_o$, which has a certain temperature $T_o$. As the air flow converges through the converging section 80 its pressure decreases as the velocity of the gas increases and its temperature decreases, where the pressure is represented by $P_i$ and the temperature is represented by $T_i$ at this location in the channel 72. The design of the nozzle 70 is such that for a particular mass air flow rate, the air flow is subsonic through the converging section 80 and reaches sonic speeds at the throat section 82. When the gas flows into the diverging section 84, the air flow accelerates to supersonic flow, further reducing the pressure and temperature of the gas represented by pressure $P_e$ and $T_e$, respectively. When the gas enters the section 88 of the nozzle 70, it is flowing supersonically, which causes it to have a reduced pressure $P_b$ and a reduced temperature $T_b$.

By providing the same amount of compressed air to the plug 60 at the same flow rate, the nozzle 70 will provide that air flow to the ring segment 46 at a lower temperature than the channel 66, which provides increased cooling to the ring segment 46. By providing the lower temperature air to the ring segment 46, a number of design changes can be made to the turbine section 16 to increase the efficiency of the engine 10. For example, if the same amount of the compressed air is provided to the turbine section 16 for cooling, then a reduced percentage of that air can be provided to cool the ring segments 16 and achieve the same amount of cooling as a result of the decrease in temperature of the cooling air. The extra cooling air now available because of the reduced amount of compressed air provided to the ring segments 46 can be used to provide increased cooling to other components in the turbine section 16, such as the vanes 32 and the blades 34. By providing increased cooling to these parts of the turbine section 16, the turbine inlet temperature can be increased, which increases the power and efficiency of the turbine engine 10. Alternately, by providing a reduced amount of cooling air to the ring segments 46 because of the decrease in temperature provided by the nozzle 70, the turbine design can be changed where a lower percentage of the compressed air is provided for cooling and more air is provided for combustion, which can be used to lower NOx emissions.

It is noted that the shape of the nozzle 70 is a general shape for a particular application for cooling the ring segments 46. The flow rate and pressure provided to each of the ring segments 46 in each of the rows is different, which would require a slightly different shape to the nozzle to achieve the desired supersonic flow. Thus, all of the diameters and configurations of the sections in the nozzle are tightly engineered to get the flow and pressure effect to create the supersonic shock wave to reduce the temperature of the air.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A gas turbine engine comprising:
a compressor section being operable to produce a compressed gas;
a combustion section in fluid communication with the compressor section that receives the compressed gas, said combustion section mixing the compressed gas with a fuel and combusting the compressed gas and fuel mixture to produce a hot working fluid; and
a turbine section in fluid communication with the combustion section, said turbine section receiving the hot working fluid to produce mechanical power, said turbine section including at least one row of vanes, at least one row of blades and a plurality of ring segments forming at least one ring, wherein the ring segments provide a sealing structure at an end of the blades, said ring segments and said at least one row of vanes being mounted to a vane carrier, said vane carrier including a ring cooling channel for each ring segment that receives a portion of the compressed gas to cool the ring segments, said turbine section further including a plug positioned in each ring cooling channel and having an internal flow channel, said internal flow channel defining a converging-diverging nozzle through which the compressed gas flows so as to create a supersonic flow that reduces the temperature of the compressed gas.

2. The gas turbine engine according to claim 1 wherein the internal flow channel includes a wide end section coupled to a converging section.

3. The gas turbine engine according to claim 2 wherein the internal flow channel includes a narrow throat section coupled to the converging section at one end and a diverging section at an opposite end.

4. The gas turbine engine according to claim 3 wherein the internal flow channel includes a wide output end section at an output end of the nozzle coupled to the diverging section where the supersonic flow occurs.

5. The gas turbine engine according to claim 1 wherein the turbine section includes four rows of vanes, four rows of blades and four rows of rings.

6. The gas turbine engine according to claim 5 wherein the ring cooling channels are only provided for the first three rows of rings.

7. The gas turbine engine according to claim 1 wherein the compressed gas is air.

8. A gas turbine engine comprising a turbine section receiving a hot working fluid, said turbine section including at least one row of vanes, at least one row of blades and a plurality of ring segments forming at least one ring, wherein the ring segments provide a sealing structure at an end of the blades, said turbine section further including at least one cooling flow channel providing a flow of cooling air to one or more of the vanes, the blades or the ring segments, said cooling flow channel including a converging-diverging nozzle through which the cooling air flows, said nozzle being configured to receive a subsonic flow of the cooling air and to create a supersonic flow of the cooling air that reduces the temperature of the cooling air.

9. The gas turbine engine according to claim 8 wherein the cooling flow channel includes a wide end section coupled to a converging section.

10. The gas turbine engine according to claim 9 wherein the cooling flow channel includes a narrow throat section coupled to the converging section at one end and a diverging section at an opposite end.

11. The gas turbine engine according to claim 10 wherein the cooling flow channel includes a wide output end section at an output end of the nozzle coupled to the diverging section where the supersonic flow occurs.

12. The gas turbine engine according to claim 8 wherein the turbine section includes four rows of vanes, four rows of blades and four rows of rings.

13. The gas turbine engine according to claim 8 wherein the at least one cooling flow channel provides a flow of cooling air to the ring segments.

14. The gas turbine engine according to claim 13 wherein the nozzle is provided within a plug positioned within the cooling flow channel.

15. A gas turbine engine comprising:
a compressor section being operable to produce a compressed gas;
a combustion section in fluid communication with the compressor section that receives the compressed gas, said combustion section mixing the compressed gas with a fuel and combusting the compressed gas and fuel mixture to produce a hot working fluid; and
a turbine section in fluid communication with the combustion section, said turbine section receiving the hot working fluid to produce mechanical power, said turbine section including at least one row of vanes, at least one row of blades and a plurality of ring segments forming at least one ring, wherein the ring segments provide a sealing structure at an end of the blades, said ring segments and said at least one row of vanes being mounted to a vane carrier, said vane carrier including a ring cooling channel for each ring segment that receives a portion of the compressed gas to cool the ring segments, said turbine section further including a plug positioned in each ring cooling channel and having an internal flow channel, said internal flow channel defining a converging-diverging nozzle including a wide end section coupled to a converging section, a narrow throat section coupled to the converging section at one end and a diverging section at an opposite end and a wide output end section at an output end of the nozzle coupled to the diverging section, wherein the compressed air flows at supersonic speeds in the diverging section that reduces the temperature of the compressed gas.

16. The gas turbine engine according to claim 15 wherein the turbine section includes four rows of vanes, four rows of blades and four rows of rings.

17. The gas turbine engine according to claim 15 wherein the ring cooling channels are only provided for the first three rows of rings.

* * * * *